2,789,080

INSULIN-ALBUMIN COMPOSITIONS

Henry Marinus Christensen, Roskilde, Denmark

No Drawing. Application August 10, 1953,
Serial No. 373,435

Claims priority, application Denmark August 14, 1952

5 Claims. (Cl. 167—75)

Several methods are known of producing preparations containing insulin with a protracted effect in relation to pure insulin preparations. Thus protamine insulin suspensions with or without zinc content are known as also insulin containing zinc in combination with an alkaline protein or a protein decomposition product and with phenol. Further, products are known to be manufactured by the conversion of insulin with gelatine esterified with methyl or ethyl compounds. It has also been proposed to convert insulin by insulin esters or by basic esters of the steroid series under special conditions.

It has now been shown that a particularly good effect may be obtained by adding to the insulin in water solution an animal protein, in which the acid groups are in whole or in a part inactivated e. g. by esterification or amidification. It is expedient to use an albumin for instance a human albumin as a protein. By changing the ratio between the quantity of protein treated and the quantity of insulin a varying scope of effect will be obtained, so that at a greater content of esterified or amidified protein a more protracted effect will result.

It is especially advantageous to use human albumins produced, for instance, from blood serum. By the use of human proteins the formation of antibodies will definitely be avoided, as also will the disadvantages entailed by the use of non-human proteins. The resulting products will in most cases be insoluble in water and may easily be separated off.

It will as a rule be the best practice to effect the esterification or amidification as far as is possible, so that the maximum number of acid groups in the proteins will be combined or inactivated.

It will be expedient at a suitable point of the reaction to add zinc-ions and one or more phenols. The addition of zinc and phenols may be made before, during or after the admixture of the proteins with the insulin. Thus, it will be advantageous to use cresols and possibly a mixture of o-, m- and p-cresol, in the following called tri-cresol.

Esterification may expediently be carried out by means of diazo-compounds of the aliphatic or contingently the aromatic group. It will be especially advantageous to use diazomethane.

Esterification may be carried out by means of alcohols with the use of catalysts, such as strong acids.

Esterification may alternatively be carried out by means of esters of strong acids, such as methyl esters of sulphuric acid or halogen hydrogens.

Amidification may according to the invention be performed by means of ammonia, amides or amines.

It has been proved that with the use of preparations produced in accordance with the invention an excellent, protracted effect of the insulin may be obtained and, particularly that the insulin effect will remain practically constant for a protracted period.

EXAMPLE 1

2 g. albumin, for instance human albumin, is dried quickly and suspended in 300 ml. dry ether, whereupon it is methylized with 1 g. diazo-methane dissolved in 50 ml. dry ether for about 3 hours at ordinary room temperature. From the dried reaction product separated off, the active ingredient—methyl albumin—is isolated by extraction with 0.01 n hydrochloric acid.

43.5 mg. crystallized insulin—23 international units per mg.—is dissolved in 10 ml. 0.01 n hydrochloric acid to which is added 2 mg. zinc-ions in the form of zinc chloride. To this solution is added 220 mg. methyl albumin produced as stated in the above and dissolved in 10 ml. 0.01 n hydrochloric acid. By means of sodium hydroxide the mixture is adjusted to a pH-value of 7.2 and diluted to 25 ml.

A suspension will thereby be obtained containing 40 units per ml. and which may be used direct for injection.

EXAMPLE 2

Methylization by diazo-methane 100 g. ox-albumin is dried quickly and ground to a fine powder. It is suspended in 5 l. dry ether and an ether solution of 20 g. diazo-methane is gradually stirred into it at a temperature of about 20° centigrade. After 3 hours of stirring the albumin is separated off. It is then washed twice with ether and dried. The product is extracted with water with an addition of acid to a pH-value of 4, and the resulting solution is dried and combined with insulin in the manner stated in Example 1.

EXAMPLE 3

Amidification with methyl-amine

A 6 percent solution of albumin in water is cooled to about 10° centigrade and dried methyl-amine is stirred into the liquid until it is saturated. The solution is left standing overnight at 10° centigrade, and is then centrifuged until clear, cooled to −5° centigrade whereupon 1 volume of absolute alcohol is added drop by drop while the solution is being stirred. The amidified albumin is separated off by centrifuging, is washed with 50 percent alcohol, dissolved in water and dried by refrigeration at a pH-value of 4. It is then combined with insulin in the manner described in Example 1.

EXAMPLE 4

Ethylization with ethyl-iodide 130 ml. 6 percent solution of albumin in water is adjusted to a pH-value of 9 by diluted sodium hydroxide and after heating to 40° centigrade 8 g. ethyl-iodide is added. The solution is stirred in closed system for 24 hours, whereupon further 8 g. ethyl-iodide is added together with diluted hydrochloric acid until a pH-value of 5. Stirring is continued for 24 hours whereupon the solution is cooled to −5° C., filtered until clear and the ethyl albumin precipitated by addition of 1 volume of alcohol. The product is washed with 50 percent alcohol and treated as in the previous examples and combined with insulin as described in Example 1.

EXAMPLE 5

For the production of a solution containing a quantity of insulin equal to 20 international units per ml., 0.914 g. crystalline insulin of a strength of about 23 I. U. per mg. is dissolved in 18 ml. 0.1 n HCl and filtered through a Seitz-EKS filter previously rinsed with 1 litre of 0.5 n hydrochloric acid and three times with 1 litre of distilled water, through a G3 or G4 flocculent filter into a glass flask previously sterilized. The filter is rinsed with a little distilled water before 18 g. glycerine, 1.5 g. tricresol and 0.6 g. phenol dissolved in distilled water, are filtered into the mixture. Finally the filter is rinsed with distilled water to a content of 1,000 ml. The pH-value of the solution is adjusted to about 3.0.

EXAMPLE 6

For the production of a solution containing a quantity of insulin of 40 I. U. per ml., 1.828 g. crystalline insulin of a strength of about 23 I. U. per mg. is dissolved in 22 ml. 0.1 n. HCl and filtered through a Seitz-EKS filter previously rinsed in 1 litre 0.5 n. HCl and 3 times with 1 litre distilled water, through a $G_3$ or $G_4$ flocculent filter into a sterile glass flask. The filter is rinsed with a little distilled water before 18 g. glycerine, 1.5 g. tri-cresol and 0.6 g. phenol dissolved in distilled water are filtered into the mixture. Finally the filter is rinsed with distilled water to a content of 1,000 ml. The pH-value of the solution is adjusted to about 3.0.

EXAMPLE 7

For the production of a solution containing a quantity of insulin of 80 I. U. per ml. 3.656 g. crystalline insulin of a strength of about 23 I. U. per mg. is dissolved in 30 ml. 0.1 n HCl and filtered through a Seitz-EKS filter previously rinsed with 1 litre 0.5 n. HCl and three times with 1 litre distilled water, through a $G_3$ or $G_4$ flocculent filter into a sterile glass flask. The filter is rinsed with a little distilled water before 18 g. glycerine, 1.5 g. tricresol and 0.6 g. phenol dissolved in distilled water are filtered into the mixture. Finally the filter is rinsed with distilled water to a content of 1,000 ml. The solution is adjusted to a pH-value of about 3.0.

EXAMPLE 8

For the production of a solution containing a quantity of zinc insulin of 20 I. U. per ml. 0.914 g. crystalline insulin of a strength of about 23 I. U. per mg. is dissolved in 35 ml. 0.1 n. HCl and mixed with 0.914 g. methyl albumin dissolved in 35 ml. $H_2O$. To the mixture are added 16 g. glycerine, 42 mg. $Zn^{++}$, 1.5 g. tri-cresol and 0.6 g. phenol. The solution is filtered through a sterile filter. The filter is rinsed with water to about 900 ml. Under sterile conditions about 59 ml. 0.1 n. NaOH is added. The pH-value of the mixture is controlled and adjusted as in Example 1 and the contents filled up to 1,000 ml.

EXAMPLE 9

For the production of a solution containing a quantity of zinc insulin of 40 I. U. per ml., 1.828 g. crystalline insulin of a strength of about 23 I. U. per mg. is dissolved in 40 ml. 0.1 n. HCl and mixed with 1.828 g. methyl albumin dissolved in 40 ml. water. To this mixture are added 16 g. glycerine, 84 mg. $Zn^{++}$, 1.5 g. tricresol and 0.6 g. phenol. The solution is filtered through a sterile filter and the filter rinsed under sterile conditions with distilled water to about 900 ml. Under sterile conditions 74 ml. 0.1 n. NaOH is added. The pH-value of the mixture is controlled and adjusted and the contents filled up to 1,000 ml.

EXAMPLE 10

For the production of a solution containing a quantity of zinc insulin of 80 I. U. per ml., 3.656 g. crystalline insulin of a strength of about 23 I. U. per mg. is dissolved in 50 ml. 0.1 n HCl and mixed with 3.656 g. methyl albumin dissolved in 50 ml. $H_2O$. To the mixture are added 16 g. glycerine, 168 mg. $Zn^{++}$, 1.5 g. tri-cresol and 0.6 g. phenol. The solution is filtered through a sterile filter and the filter rinsed with water to about 850 ml. Under sterile conditions about 104 ml. 0.1 n NaOH is added. The pH-value of the mixture is controlled and adjusted and the contents filled up to 1,000 ml.

EXAMPLE 11

For the production of a solution containing a quantity of zinc insulin of 40 I. U. per ml., 1.828 g. crystalline insulin of a strength of about 23 I. U. per mg. is dissolved in 40 ml. 0.1 n HCl and mixed with 0.366 g. methyl albumin dissolved in 40 ml. water. To this mixture are added 16 g. glycerine, 84 mg. $Zn^{++}$, 1.5 g. cresol and 0.6 g. phenol. The solution is filtered through a sterile filter and the filter rinsed with distilled water to about 900 ml. Under sterile conditions about 61 ml. 0.1 n NaOH is added until a pH-value of 7.1 is obtained and the contents filled up to 1,000 ml.

What we claim is:

1. An aqueous composition of matter comprising insulin and an esterified animal albumin selected from the class consisting of methyl and ethyl albumin.

2. An aqueous composition of matter comprising insulin, zinc, and an esterified animal albumin selected from the class consisting of methyl and ethyl albumin.

3. An aqueous composition of matter comprising insulin, zinc, a phenol, glycerine and an esterified animal albumin selected from the class consisting of methyl and ethyl albumin.

4. An aqueous composition of matter comprising insulin, zinc, the methyl ester of human albumin, phenol, a cresol, and sufficient alkali metal hydroxide to impart to the solution a pH of about 7.

5. An aqueous composition of matter comprising insulin, zinc, the ethyl ester of human albumin, phenol, a cresol, and sufficient alkali metal hydroxide to impart to the solution a pH of about 7.

References Cited in the file of this patent

UNITED STATES PATENTS

| | | |
|---|---|---|
| 2,050,558 | Bockmuhl | Aug. 11, 1936 |
| 2,354,211 | Lang | July 25, 1944 |
| 2,574,889 | Rosenberg | Nov. 13, 1951 |